Aug. 4, 1942.　　　S. TAYLOR　　　2,291,848
APPARATUS FOR MELTING LEAD AND OTHER METALS
Filed Feb. 16, 1940　　　3 Sheets-Sheet 1

Inventor:
Sidney Taylor
by his attys
Stebbins Blenko & Parmelee

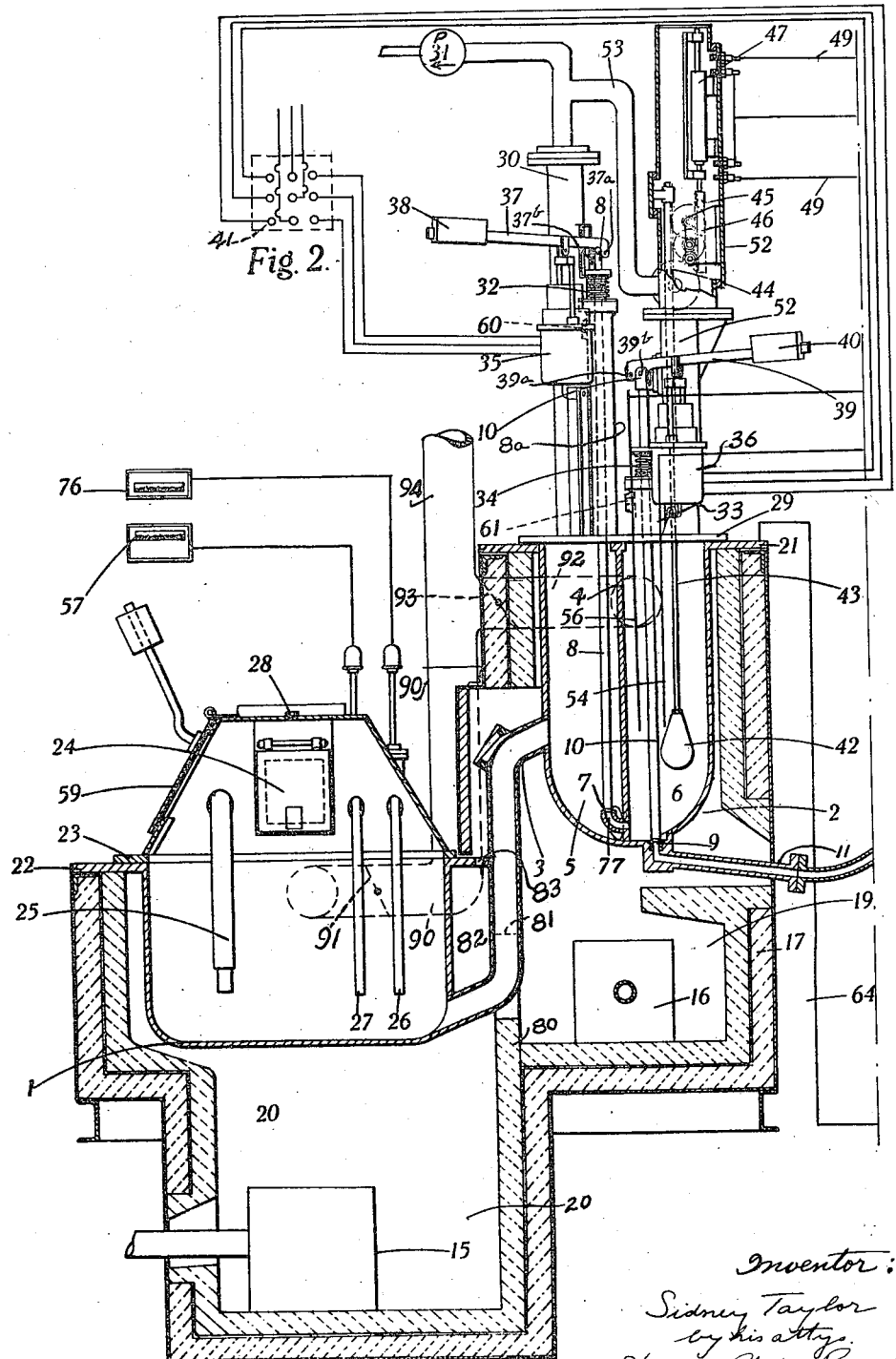

Aug. 4, 1942.　　　　S. TAYLOR　　　　2,291,848
APPARATUS FOR MELTING LEAD AND OTHER METALS
Filed Feb. 16, 1940　　　3 Sheets-Sheet 3

Patented Aug. 4, 1942

2,291,848

UNITED STATES PATENT OFFICE 2,291,848

APPARATUS FOR MELTING LEAD AND OTHER METALS

Sidney Taylor, Whitefield, England, assignor of one-half to British Insulated Cables Limited, Prescot, Lancashire, England, a company of Great Britain Application February 16, 1940, Serial No. 319,295 In Great Britain February 28, 1939

4 Claims. (Cl. 266—33)

This invention relates to apparatus for melting lead and lead alloys and other metals of low melting point (which will hereinafter be referred to by the term "metal") in which the preparation of the molten metal takes place in two stages, being carried out in two inter-connected vessels, the first of which may be described as the "receiving vessel" and the second as the "delivery vessel." The receiving vessel is that into which the pigs of solid metal are fed from time to time and from which the molten metal flows through the interconnecting passage into the delivery vessel where further heating is applied.

In accordance with the invention, apparatus for melting metal comprises a receiving vessel which is in communication with a delivery vessel and separate heating means are provided for the two vessels and means are provided for operating the receiving vessel, under atmospheric or somewhat higher pressure and the delivery vessel under vacuum. The difference in pressure between the two vessels causes the metal to flow from the receiving vessel to the delivery vessel. Provision of separate heating means has the advantage that the temperatures of the two vessels may be separately controlled so that the metal in the delivery vessel may be maintained at a higher temperature than that in the receiving vessel. By subjecting the metal in the delivery vessel to an appropriately high temperature and, at the same time, to a high degree of vacuum, the extraction of gases carried in and given off by the molten metal in the delivery vessel is facilitated.

Two forms of construction, in accordance with the invention, are illustrated by way of example in the accompanying drawings wherein:

Figures 2 and 2a show a modified form of construction.

Figure 1:
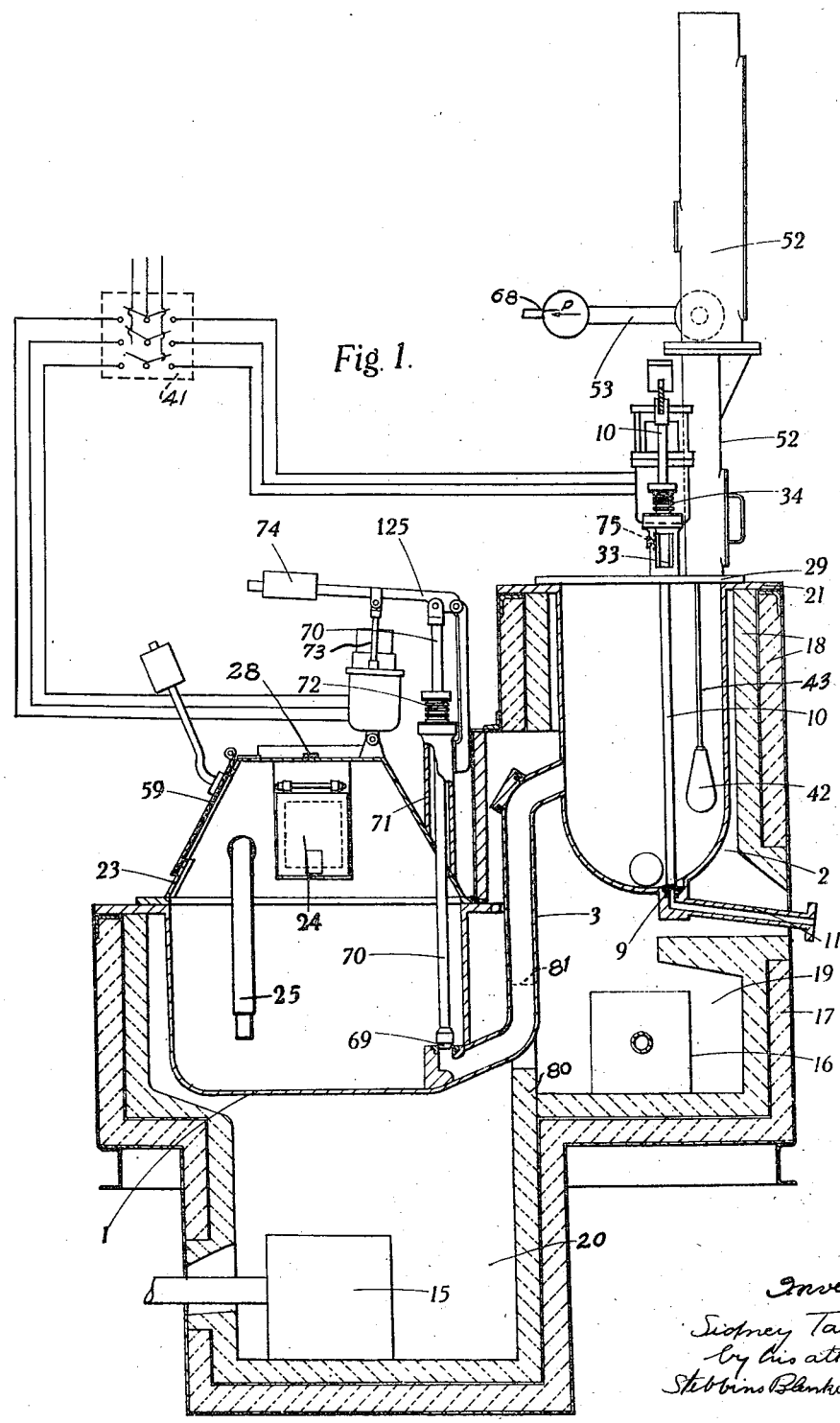
Figure 1 shows one form of apparatus in sectional elevation.

Referring first of all to Figure 1, the melting apparatus shown therein comprises a receiving vessel 1 and a delivery vessel 2, having a hemispherical shaped bottom. The capacity of the former is substantially larger than that of the latter vessel. The receiving vessel is provided with a cover 23 fitted with a door 24 which normally makes a gas-tight fit with the cover but which when opened permits pigs of metal to be fed to the receiving vessel 1. The metal in the latter vessel is heated in the presence of nitrogen or other inert gas to bring it to the molten condition and it is then drawn into the delivery vessel 2 through a pipe 3 connecting the two vessels. The receiving and delivery vessels are supported within an enclosure 17 having a double wall or lining 18 made of refractory and insulating material. As will be seen from the figure, the enclosure is so constructed that one part projects vertically upwards by some distance beyond the other part. In the figure the right hand part of the enclosure is shown extending upwards beyond the left hand part. The receiving vessel has a flange 22 and the delivery vessel, a flange 21 and the two vessels are supported by their flanges which rest upon the upper edge of the wall of the enclosure 17, the delivery vessel being supported by the higher part of the enclosure. The delivery vessel thus occupies an elevated position with regard to the receiving vessel. This arrangement is of advantage as it permits the delivery vessel to be placed under a high vacuum without the metal being drawn up into the vacuum pipe. The enclosure 17 is so constructed as to form two compartments 19 and 20, the former containing a burner 16 for the delivery vessel 2 and the latter a separate burner 15 for the receiving vessel 1. The two vessels thus have separate means for heating them. This arrangement has the advantage that the temperatures of the two bodies of metal in the receiving and delivery vessels may be separately controlled so that where necessary the metal in the delivery vessel may be maintained at a substantially higher temperature than that at which the metal in the receiving vessel is maintained. Separate exhaust flues 90 and 92 connecting into a common flue 94 are provided for the chambers 20 and 19 respectively. The flues are controlled by dampers 91 and 93. The enclosure 17 also has a partition 80, the upper edge of which is shown by the dotted line 81. This partition assists in directing the flow of hot gases from the burner 15 around the pipe 3 so as to keep the metal in the pipe 3 in molten condition. The hot gases flow into the space 82 between the vessel 1 and the pipe 3 and pass out through the opening 83. The receiving vessel has a float indicator 25 to give a visual indication of the level of the metal in the vessel.

The pipe 3 which connects the receiving vessel 1 and the delivery vessel 2 leads into the former vessel at the bottom thereof and meets the latter vessel at a place somewhat less than half way up that vessel. Between the two vessels the pipe 3 occupies a vertical position. This arrangement of the pipe 3 provides a seal of molten metal between the two vessels preventing leakage of gas from the receiving vessel 1 to the delivery vessel 2.

The cover 23 of the receiving vessel 1 has an aperture 28 for the admission of an inert gas at a pressure somewhat above atmospheric, and a gas tight door 59 which permits dross to be removed from the surface of the molten metal.

The passage of the molten metal from the receiving vessel 1 into the delivery vessel 2 takes place due to the difference of pressure between these two vessels, the metal in the former vessel being under a pressure somewhat above atmospheric and the latter vessel being under vacuum. To enable the latter vessel to be placed under vacuum, a cover plate 29 closing the delivery vessel 2 is provided with a tubular casing 52 which projects upwards from the cover plate. The tubular casing 52 communicates with the delivery vessel 2 and can be placed under a high vacuum by a vacuum pump 68 which is connected to a pipe 53 in communication with the casing 52.

The flow of metal from the receiving vessel 1 through the pipe 3 into the delivery vessel 2 is controlled by a valve 69 which has a valve rod 70 passing through an aperture in the wall of the cover 23. The valve rod extends beyond the cover and passes through a tubular member 71 which is mounted on the cover and at its upper end has a gland 72 through which the upper end of the valve rod 70 passes. The flow of metal from the delivery vessel 2 into a delivery pipe 11 is controlled by a valve 9 having a valve rod 10 which extends upwards and passes through an aperture in the cover plate 29 and through a tubular member 33 mounted on the cover plate and through a gland 34 fixed to the upper end of the tubular member 33. The gland 72 prevents leakage of inert gas from the receiving vessel 1 and the gland 34, the ingress of air to the delivery vessel 2.

If the melting apparatus is required to discharge metal intermittently, it is necessary that the two valves 9 and 69 should never be open at the same time and for this reason the two valve rods 10 and 70 are electrically interconnected as shown, each valve being held in the open position by an electrically operated thruster and closed automatically under the influence of a weight. In the figure, a thruster 73 is shown mounted on the top of the cover 23 of the receiving vessel 1. When the circuit for this thruster is closed by the switch 41 the valve rod 70 is raised and the valve 69 opened. The valve is closed automatically under the action of a weight 74 carried by an arm 125 connected to the upper end of the valve rod 70. The valve rod 10 is also adapted to be operated by a thruster, the valve 9 being closed automatically by a weight as in the case of the valve 69. In Figure 2, the valve rod 10 is there shown as being operated by a thruster 36. Upon actuating the change over switch 41, the circuit of one thruster is closed while the other remains open. In the position shown the circuits of both thrusters are open.

In order that the operator of the melting apparatus may be able to ascertain at all times the position of the level of the metal in the delivery vessel 2, the latter is fitted with a float 42 to which is attached a float rod 43. The latter passes upwards through the cover plate 29 and extends into the tubular casing 52. As the level of the metal in the delivery vessel 2 varies, the position of the float rod 43 will accordingly vary and this linear movement is converted into a rotary one by a convenient form of mechanism. Such mechanism is shown housed in the tubular casing 52 shown in Figure 2 and is described in greater detail in connection with that figure.

The provision of separate heating means for the receiving and delivery vessels has the advantage that the temperatures in the two vessels can be separately controlled so that where necessary the metal in the delivery vessel can be maintained at a higher temperature than that in the receiving vessel. This feature, in conjunction with the employment of a high vacuum above the metal in the delivery vessel 2 permits of a thorough extraction and removal of the gases carried in and given off by the metal in that vessel.

When the apparatus is in operation metal in solid form will be supplied as required to the receiving vessel 1 where it is melted. During this period the valves 69 and 9 will be closed. Vacuum is not placed on vessel 2 until sufficient depth of lead is attained in vessel 1. The difference of pressure between the two vessels causes the metal to flow from the bottom of the receiving vessel up the pipe 3 into the delivery vessel 2. As the metal flows in the float 42 will continue to rise until the valve 69 is closed, or the difference in levels between vessels 1 and 2 is equivalent to the pressure head resulting from the difference in pressure in the two vessels. This depends on inert gas pressure in the receiving vessel and the degree of vacuum in the delivery vessel. The molten metal may be heated in the delivery vessel to a higher temperature while being maintained under vacuum and when ready for discharge, the valve 9 is opened. If the apparatus to which the molten metal is being delivered is also under vacuum the metal can be arranged to fall by gravity only. If however the utilising apparatus is subjected to atmospheric pressure then nitrogen or other inert gas can be admitted through an aperture 75 in the tubular casing 33 to break the vacuum on delivery vessel 2.

Figure 2A:
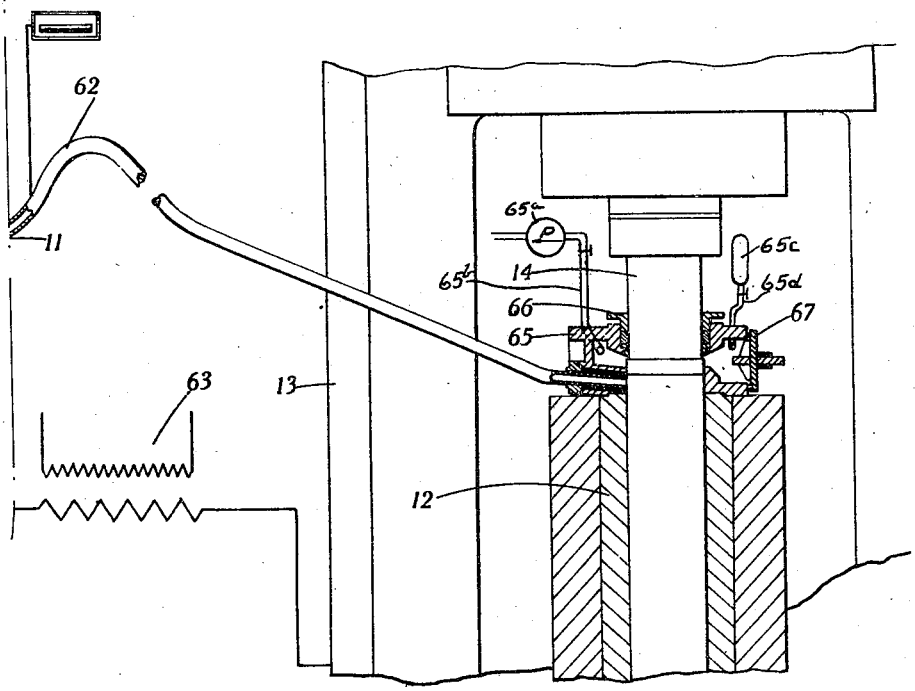

Referring now to Figures 2 and 2a, the melting apparatus is there shown as being used for delivering molten metal intermittently to an extrusion press. The melting apparatus comprises a receiving vessel 1 and a delivery vessel 2 connected by a pipe 3 and supported within an enclosure 17 as in Figure 1 and each vessel is provided with its own heating means, that for the receiving vessel 1 consisting of a burner 15 while the delivery vessel has a burner 16. The burners may use oil, gas or other suitable fuel. The receiving vessel 1 is constructed in the same manner as that shown in Figure 1 except that it is not provided with a valve in the lower end of the pipe 3. The receiving vessel has a float indicator 25 to give a visual indication of the level of the metal in the vessel, a thermostat 27 for controlling the fuel supplied to the burner 15, and a thermometer 26. The temperature is read off from a scale 76 and a scale 57 indicates the temperature setting at which the thermostat 27 is intended to function. The receiving vessel has a door 24 for the supply of the pigs of metal and a door 59 for the removal of dross from the surface of the molten metal. The arrangement of the connecting pipe 3 is also the same as in the previous figure and the delivery vessel 2 occupies an elevated position with regard to the receiving vessel 1 as previously.

The construction of the delivery vessel 2 shown in Figure 2 is modified as compared with that of Figure 1, by the provision of a vertically disposed partition 4 which divides the delivery vessel into two chambers. For convenience of description the two chambers 5 and 6 formed by the partition 4 will be referred to hereinafter as the draw-off chamber and the measuring chamber respectively. Molten metal from the receiving vessel 1 enters the draw-off chamber 5 through the pipe 3 and is supplied to the measuring chamber 6 through a small curved pipe 77 fixed to the partition 4 near its bottom, the inlet to the pipe being controlled by a valve 7 actuated by a valve rod 8. The measuring chamber 6 has at its lower end a valve 9 actuated by a valve rod 10 and controlling the flow of metal from the measuring chamber through a delivery pipe 11 to a sealed enclosure 65 disposed at the upper end of a container 12 of an extrusion press 13. The upper end of the container is disposed at a level which is lower than the bottom of the delivery vessel. The press 13 has a fixed container and a movable ram 14, the latter entering the top of the container to extrude plastic metal from the lower end thereof. The movement between the container and the ram, however, is a relative one only and the container may be the movable member and the ram the fixed member.

Referring again to the delivery vessel 2, this is closed in a gas tight manner by a cover plate 29 which is common to the draw-off chamber 5 and also to the measuring chamber 6. The draw-off chamber is provided with an upwardly extending pipe 30 to which a vacuum pump 31 is connected. The pump 31 enables the draw-off chamber 5 and the measuring chamber 6 to be placed under a high vacuum which may be, for example, of the order of 1 mm. of mercury absolute pressure.

The valve rod 8 which controls the outlet of metal from the draw-off to the measuring chamber extends upwardly through the cover plate 29 of the delivery vessel and it enters and passes through a tubular member 8a which is mounted on top of the cover plate 29 and is provided with a gland 32 through which the upper end of the valve rod 8 extends. The gland prevents the entry of air into the draw-off chamber 5. The connections to the upper end of the valve rod 8 and the operation of the valve 7 will be described below in greater detail. The measuring chamber 6 is provided with a tubular member 33 mounted on the cover plate 29 and the valve rod 10 passes through that tubular member and also through a gland 34, the latter preventing the entry of air into the measuring chamber.

As the container 12 of the extrusion press 13 receives molten metal intermittently, it is necessary to ensure that the two valves 7 and 9 are not both open at the same time and for this purpose the valve rods 8 and 10 are interconnected by electrically operated thrusters 35 and 36. The thruster 35 acts upon an arm 37 pivoted at 37a and provided with a weight 38 and the thruster 36 acts upon an arm 39 pivoted at 39a and provided with a weight 40. One end of the arm 37 is pivoted at 37b to the upper end of the valve rod 8 and one end of the arm 39 is pivoted at 39b to the upper end of the valve rod 10. When the thrusters are operated, they raise their respective valve rods and when the current to the thrusters is cut off the valves are automatically closed by the weights 38 and 40 which press their respective valve rods downwards. The two thrusters 35 and 36 are controlled by the change over switch 41. The switch 41 is so constructed that the circuits for the thrusters cannot be closed but can be opened at the same time. The switch conveniently may be placed at the extrusion press controls.

As it is important that the correct amount of molten metal should be delivered to the container 12 after each extrusion stroke of the ram 14, means are provided whereby the press operator may ascertain at all times the position of the level of the metal in the measuring chamber 6. For this purpose that chamber is provided with a float 42 to which is connected a float rod 43 which passes through an aperture in the cover plate 29 and at its upper end is provided with a rack 44. As the float moves up and down in the measuring chamber 6, according to the level of the metal therein, the movements of the float are communicated from the rack 44 to a shorter rack 45 through gearing 46. The movement of the rack 45 is comparatively small as compared with that of the rack 44 and the rack 45 carries an electrical transmitter 47, the movement of which is conveyed to an electrical indicator 48 through leads 49. The indicator can conveniently be placed at the extrusion press 13 or at some other suitable position and it is provided with a pointer 50 which moves over a scale 51. The upper end of the rod 43, attached to the float 42, racks 44 and 45, gearing 46 and transmitter 47 are all housed inside a tubular casing 52 which is mounted on top of the cover plate 29 over the measuring chamber 6. The measuring chamber 6 can be placed under vacuum by the vacuum pump 31 which is in communication with the tubular casing 52 through a pipe 53. The indicator provides a readily accessible visible indication of the position of the level of the metal in the measuring chamber 6 at all times. It thus permits the press operator to ascertain the level of the metal in the measuring chamber 6 before discharge to the press container 12 commences and to continue to watch the level as the charging of the container continues and to stop the filling operation when the pointer 50 of the indicator 48 indicates that the required amount of metal has been delivered to the press container 12. When this occurs the switch 41 is operated to cause actuation of the valve rod 10 and closing of the valve 9. The final position of the pointer 50 after filling has been completed will indicate to the operator the amount of metal remaining in the measuring chamber 6. The measuring chamber is normally designed to give a full container charge without completely emptying the measuring chamber, and to prevent such complete emptying which may be detrimental to the construction of the delivery vessel a curved part 62 in the delivery pipe 11 may be used. The curved part extends upwards above the level of the bottom of the delivery vessel. Since a high vacuum of the order of 1 mm. of mercury absolute pressure is maintained in the measuring chamber 6, the metal in the pipe 11 cannot rise appreciably above the level of the metal in the chamber 6. This ensures that the metal ceases to flow through delivery pipe 11 when the level of the metal falls to a certain point in the measuring chamber 6. The height of the curved part 62 above the bottom of the measuring chamber would be determined having regard to the capacity of the container 12 and to the initial height of the metal in the measuring chamber before discharge takes place such height being fully indicated by the pointer 50, and the actual initial height itself being determined by the difference of pressure existing in the receiving and delivery vessels.

In addition the employment of a delivery pipe having a curved part between the measuring chamber 6 and the container 12 has the advantage of maintaining a balanced pressure upon the valve 9 so that the valve could be left open without metal flowing to the container 12 after the level of the metal in the measuring chamber 6 had fallen to the level of the curved part 62 since the degree of vacuum maintained upon the container 12 is the same as that maintained upon the metal in the delivery vessel 2.

The curved part is thus useful in those cases where difficulty is experienced in preventing the flow of metal past the valve 9 when the latter is closed as for example when the metal being treated is lead.

The measuring chamber 6 is provided with a thermostat 56 which is used to control the supply of fuel to the burner 16, and a thermometer 54. The thermostat has a scale 58 and the thermometer a scale 55. The thermostats 27 and 56 may control the supply of fuel to their respective burners by operating relays which control the motor circuits of the burners. Other forms of thermostatic control depending upon the type of fuel used, however, may be used.

In order to maintain the metal in a fluid condition in its passage from the measuring vessel 6 to the press container 12 through the delivery pipe 11, the latter is heated by any convenient means, for example, as shown in the figure, by a transformer 63, the secondary winding of which is connected to the extrusion press 13 and to the flange 21 of the delivery vessel 2, the current flowing through the delivery pipe 11 which forms part of the circuit. The sealed enclosure 65 has means for placing it under vacuum and for connecting it to a supply of inert gas. Such means may comprise a pump 65a connected to the enclosure by a pipe 65b and a gas storage bottle 65c connected by a pipe 65d.

When the melting apparatus is to be used in conjunction with a metal extrusion press, the following procedure may be adopted. The metal to be extruded is prepared in the receiving vessel 1 and delivery vessel 2. An appropriate quantity of metal in solid form is supplied to the receiving vessel, valves 7 and 9 being closed. An inert gas is admitted under a pressure somewhat above atmospheric to the receiving vessel 1, and the delivery vessel 2 and the enclosure 65 are placed under the same degree of vacuum, for example, of the order of 1 mm. of mercury absolute pressure, after the metal has reached a molten state and a sufficient depth has been attained in receiving vessel 1 to provide a seal against the flow of gas from receiving chamber 1 into the delivery vessel 2. The metal then automatically flows from the receiving vessel into the draw-off chamber 5 where it is heated to high temperature in conjunction with the vacuum providing thorough extraction of gaseous impurities from the metal. The extent to which the metal fills the draw-off chamber is dependent upon the difference in pressure attained in the receiving vessel of the draw-off chamber. By operating the appropriate thruster, the valve 7 is now opened and metal flows into the measuring chamber 6, the level of the metal continuing to rise until the current to the thruster is cut off when the valve 7 automatically closes. If the measuring chamber has a visible indicator the operator can watch it until it shows him that sufficient metal has entered that chamber to fill the press container 12 without overfilling it. If valve 7 is allowed to remain open the metal flows into the measuring chamber to attain a level in the measuring chamber 6 equal to that of the draw-off chamber, the level being indicated by the needle 50 of the indicator. When ready the operator closes valve 7 and opens valve 9 allowing the metal to flow through the delivery pipe 11 into the container 12 until the indicator shows that the level of the metal in the measuring chamber 6 has fallen to the appropriate level, when the valve 9 is closed. The metal in the container is now cooled to bring it to the plastic state and the ram 14 forced down into the container to extrude the metal from the lower end thereof. If the measuring chamber has no float, the metal in that vessel must rise to the same or to approximately the same height after each extrusion operation, the lower level of the metal being determined by the height of the curved part 62 above the bottom of the measuring chamber. After the metal has been extruded the valve 7 can be again opened and a further quantity admitted to and discharged from the measuring chamber 6. If both float and curved part 62 are used, the latter will ensure that the flow of metal from the measuring chamber ceases at a predetermined level should the operator not close the valve 9 when the press container 12 is full.

By the present invention I provide an improved form of melting apparatus facilitating the extraction of gases from metals and thereby the production of pure and homogeneous metals which are particularly suitable for extruding and I also provide a melting apparatus which is particularly suitable for use with extrusion apparatus of the kind in which the extrusion operation is intermittent. Various modifications may be made within the scope of the invention, for example, the valves need not necessarily be electrically operated.

What I claim as my invention is:

1. A melting apparatus adapted to deliver intermittently a supply of oxygen-free molten metal to a utilizing apparatus, the said melting apparatus comprising in combination, a receiving vessel for receiving metal in solid form, means for operating the receiving vessel at at least atmospheric pressure, a heater for the receiving vessel for raising the temperature of metal therein to the melting point, a delivery vessel for the further treatment of the metal, an enclosed passage between the delivery vessel and the lower part of the receiving vessel placing those vessels in communication, a separate heater for the delivery vessel for raising the temperature of metal therein to substantially above the melting point of the metal, means for maintaining the metal in the delivery vessel under high vacuum, a valve in the path of metal passing from the receiving vessel to the delivery vessel, an outlet at the lower part of the delivery vessel, a valve in the path of metal flowing through the outlet and means connecting the two valves preventing them being open both together.

2. A melting apparatus adapted to deliver intermittently a supply of oxygen-free molten metal to a utilizing apparatus, the said melting apparatus comprising in combination, a receiving vessel for receiving metal in solid form, means for operating the receiving vessel at at least atmospheric pressure, a heater for the receiving vessel for raising the temperature of metal therein to the melting point, a delivery vessel outside the receiving vessel for the further treatment of the metal, a pipe directly connecting the delivery vessel and the lower part of the receiving vessel, a separate heater for the delivery vessel for raising the temperature of metal therein to substantially above the melting point, means for maintaining the metal in the delivery vessel under a high vacuum, a valve in the receiving vessel in the path of metal passing from the receiving vessel to the delivery vessel through the enclosed passage connecting the two vessels, the high vacuum maintained upon the delivery vessel withdrawing automatically metal from the receiving vessel and passing it to the delivery vessel when the said valve is opened, an outlet for oxygen-free molten metal at the lower part of the delivery vessel, a valve in the path of metal flowing through the said outlet, and means connecting the two valves preventing them being open both together.

3. A melting apparatus adapted to deliver intermittently a supply of oxygen-free molten metal to a utilizing apparatus, the said melting apparatus comprising in combination, a receiving vessel for receiving metal in solid form, means for operating the receiving vessel at at least atmospheric pressure, a heater for that vessel adapted to raise the temperature of metal therein to the melting point, a delivery vessel for the further treatment of the metal, a draw-off vessel in communication with the lower part of the delivery vessel, an enclosed passage connecting the draw-off vessel and the lower part of the receiving vessel and placing those two vessels in communication, means for raising the temperature of metal in the draw-off vessel and in the delivery vessel to substantially above the melting point, means for maintaining the draw-off vessel and the delivery vessel under high vacuum, the high vacuum serving to maintain a body of molten metal in the draw-off vessel for supplying the delivery vessel, a valve in the path of metal passing into the delivery vessel from the draw-off vessel, the said valve when opened permitting metal to flow from the draw-off vessel to the delivery vessel, an outlet for oxygen-free molten metal at the lower part of the delivery vessel, a valve in the path of metal flowing through the outlet, and means connecting the two valves preventing them being both open together.

4. A melting apparatus adapted to deliver intermittently a supply of oxygen-free molten metal to a utilizing apparatus, the said melting apparatus comprising in combination, a receiving vessel for receiving metal in solid form, means for operating the receiving vessel at at least atmospheric pressure, a heater for that vessel for raising the temperature of metal therein to the melting point, a second vessel for the further treatment of the metal, a partition dividing said vessel into a draw-off vessel and a delivery vessel, an enclosed passage connecting the draw-off vessel and the lower part of the receiving vessel, a part in the lower part of the partition placing the draw-off vessel in communication with the delivery vessel, a valve for opening and closing the port, a heater common to the draw-off and delivery vessels for raising the metal in those vessels to a temperature substantially above the melting point, means for maintaining the draw-off and delivery vessels under the same degree of high vacuum, an outlet for oxygen-free molten metal at the lower part of the delivery vessel, a valve in the path of metal flowing through the outlet, and means preventing both valves being open together.

SIDNEY TAYLOR.